United States Patent
Parmar et al.

(10) Patent No.: US 10,778,006 B2
(45) Date of Patent: Sep. 15, 2020

(54) CHIP POSITION SENSING FOR BATTERY PROTECTORS

(71) Applicant: TEXAS INSTRUMENTS INCORPORATED, Dallas, TX (US)

(72) Inventors: Manish Parmar, Bangalore (IN); V V Shyam Prasad, Bangalore (IN); Abhijeet Kumar Singh, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/159,323

(22) Filed: Oct. 12, 2018

(65) Prior Publication Data

US 2020/0099222 A1 Mar. 26, 2020

Related U.S. Application Data

(60) Provisional application No. 62/735,620, filed on Sep. 24, 2018.

(51) Int. Cl.
*H02J 1/10* (2006.01)
*H02J 1/14* (2006.01)
*H02J 7/00* (2006.01)

(52) U.S. Cl.
CPC ............ *H02J 1/102* (2013.01); *H02J 1/14* (2013.01); *H02J 7/0018* (2013.01); *H02J 7/0021* (2013.01); *H02J 7/0026* (2013.01); *H02J 1/106* (2020.01)

(58) Field of Classification Search
CPC .. H02J 1/102; H02J 1/14; H02J 7/0047; H02J 7/007; H02J 7/0018; H02J 7/0021; H02J 7/0026; H02J 7/0013; H02J 7/04; H02J 2007/0037; H02J 2007/005; H02J 2001/106; H02J 7/0014; H02J 7/1492; B60L 53/53; B60L 58/22
See application file for complete search history.

(56) References Cited

U.S. PATENT DOCUMENTS

| | | | | |
|---|---|---|---|---|
| 5,170,360 | A * | 12/1992 | Porter | H02H 3/00 700/293 |
| 5,767,659 | A * | 6/1998 | Farley | H01M 10/46 320/106 |
| 7,414,854 | B1 * | 8/2008 | Douglas | G06F 1/30 361/752 |
| 8,054,034 | B2 * | 11/2011 | Lim | H02J 7/0016 320/101 |
| 8,288,991 | B2 * | 10/2012 | Sardat | B60L 3/06 320/118 |
| 8,324,868 | B2 * | 12/2012 | Choi | B60K 6/28 320/150 |
| 8,890,482 | B2 * | 11/2014 | Ikeuchi | H02J 7/0031 320/134 |
| 9,030,167 | B2 * | 5/2015 | Yamaguchi | H01M 10/425 320/117 |

(Continued)

*Primary Examiner* — Helen Rossoshek
(74) *Attorney, Agent, or Firm* — Michael A. Davis, Jr.; Charles A. Brill; Frank D. Cimino

(57) ABSTRACT

A battery system includes a position detector configured to detect whether a first battery protector is coupled to a second power rail and positioned at a bottom of a stack. A cell balancing input (CBI) is coupled to receive a CBI signal to enable or disable cell balancing of the first battery protector. A cell balancing output (CBO) enables cell balancing of a second protector in the stack.

16 Claims, 8 Drawing Sheets

(56) References Cited

U.S. PATENT DOCUMENTS

| | | | |
|---|---|---|---|
| 9,340,122 B2* | 5/2016 | Yamauchi | G01R 31/396 |
| 9,584,769 B2* | 2/2017 | Elsemore | H04N 7/18 |
| 9,608,297 B2* | 3/2017 | van Lammeren | H01M 10/4257 |
| 2008/0150488 A1* | 6/2008 | Lu | H02J 7/0031 320/134 |
| 2009/0171598 A1* | 7/2009 | Nakashima | G01R 19/16542 702/63 |
| 2013/0154656 A1* | 6/2013 | Tabatowski-Bush | G01R 31/025 324/434 |
| 2014/0184168 A1* | 7/2014 | Park | H02J 7/0014 320/136 |
| 2015/0042283 A1* | 2/2015 | Camp | H02J 7/0019 320/121 |
| 2015/0241520 A1* | 8/2015 | Ohtake | G01R 31/396 324/434 |
| 2016/0106174 A1* | 4/2016 | Chung | A42B 3/0453 340/539.13 |
| 2017/0331303 A1* | 11/2017 | Ha | H02J 7/0022 |
| 2018/0090950 A1* | 3/2018 | Huang | H01M 10/486 |
| 2018/0151919 A1* | 5/2018 | Sasaki | H02J 7/02 |

* cited by examiner

CHIP POSITION SENSING FOR BATTERY PROTECTORS

CROSS REFERENCE TO RELATED APPLICATIONS

This application claims the benefit of U.S. Provisional Patent Application 62/735,620 filed on 24 Sep. 2018, and entitled CHIP POSITION SENSING FOR BATTERY PROTECTORS, the entirety of which is incorporated by reference herein.

TECHNICAL FIELD

This disclosure relates to chip position sensing for battery protectors.

BACKGROUND

Current cell balancing systems include a set of battery protectors that each monitors a subset of cells in a battery pack. Each battery protector remains in cell balancing mode regardless of the charge condition state of the subset being monitored or the state of charging of other cell members in the battery pack. For instance, each battery protector will monitor and balance its respective subset of cells even if another set of cells has faulted due to over-current discharge, over-voltage, or other considerations. Expensive interfaces have been considered for each battery protector in the stack to indicate when a fault has occurred and to allow individual on and off control of each protector. A host processor is usually also required to monitor status from each protector and to disable the protector under detected fault conditions. This type of individual control and monitoring for each protector adds considerable expense to the overall stack of protectors in addition to needing host interactions to properly control the stack.

SUMMARY

In one example, a battery system includes a plurality of battery cells connected between a first power rail and a second power rail. First and second battery protectors are configured as a stack of battery protectors. Each battery protector of the stack is coupled to a respective subset of the plurality of battery cells. The first battery protector includes a position detector configured to detect whether the first battery protector is positioned at a bottom of the stack based on whether the first battery protector is coupled to the second power rail. The first battery protector includes a cell balancing input (CBI) coupled to receive a CBI signal to enable or disable cell balancing of the first battery protector. The first battery protector includes a cell balancing output (CBO) coupled to enable or disable cell balancing of the second battery protector in the stack. The first battery protector positioned as the bottom device of the stack is configured to sense an electrical condition of the battery system and to control the CBO in response to the CBI signal and based on a sensed electrical condition.

In another example, a battery protector device includes a plurality of battery cell inputs. A position detection circuit having a position detection input is coupled to a position input terminal of the device and another input is coupled to a threshold voltage. An output of the position detection circuit is coupled to an input of a processor. The processor is coupled to a cell balancing output (CBO) terminal and coupled to a cell balancing input (CBI) terminal.

In yet another example, a method includes detecting a signal at a position input terminal of a given battery protector. The method includes determining whether the given battery protector is positioned at a bottom of a stack of battery protectors based on the detected signal. The method includes receiving a cell balancing input (CBI) signal at a CBI of the given battery protector to enable or disable cell balancing of the given battery protector based on the CBI signal. The method includes sensing, at current sense input terminals of the given battery protector, current from the plurality of battery cells if the given battery protector is detected at the bottom of the stack of battery protectors. The method includes generating a cell balancing output (CBO) signal at a CBO terminal of the given battery protector to enable or disable another battery protector in the stack of battery protectors based on the CBI and the sensed current.

DETAILED DESCRIPTION

Figure 1:
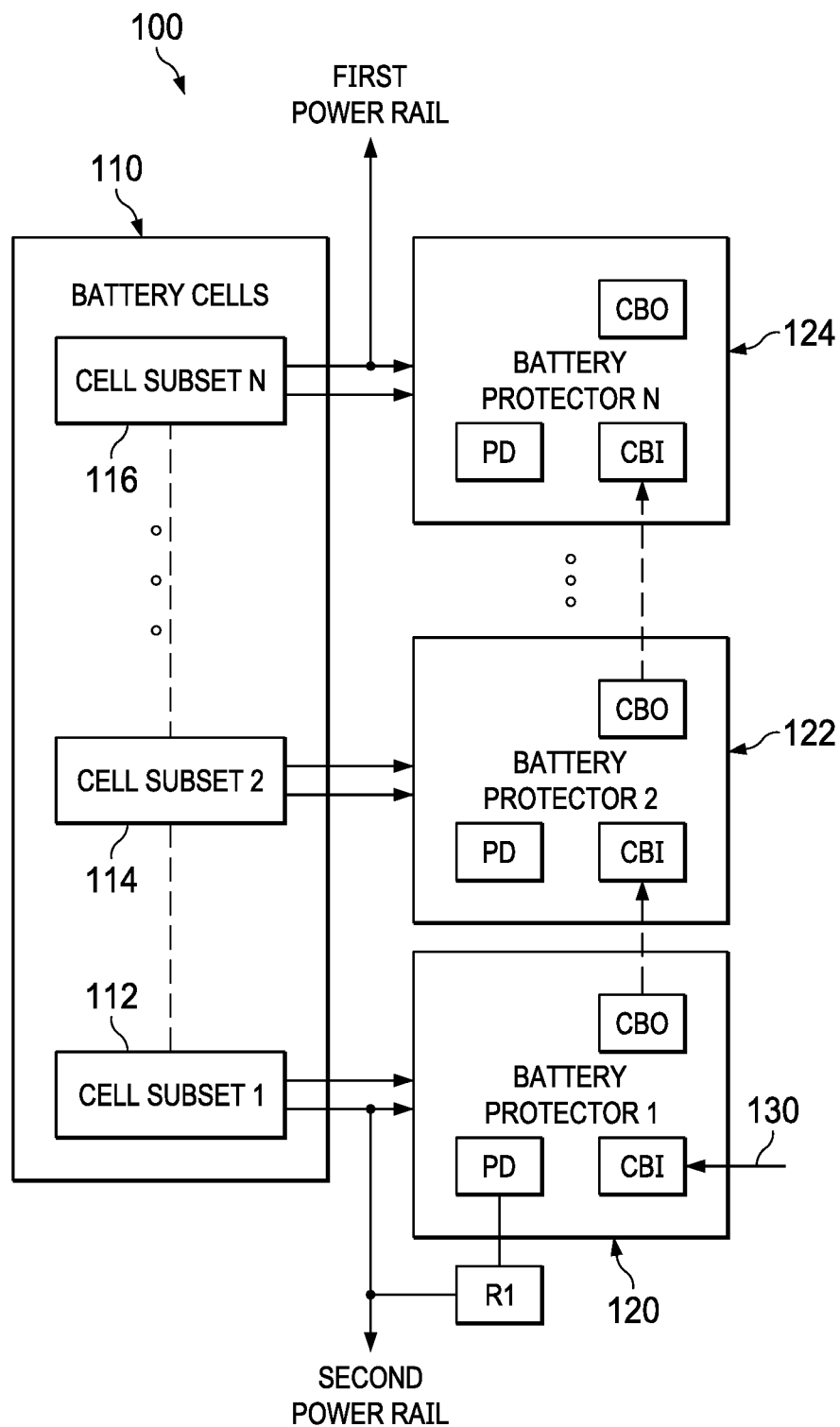
FIG. 1 illustrates an example block diagram of a battery system that employs chip position sensing.

This disclosure relates to chip position sensing for battery protector systems. The approach disclosed herein can reduce sensing and communications circuits within individual battery protectors of the system. In many existing battery systems, cell balancing remains ON regardless of charging state of the battery cells. Additionally, existing battery protector chips do not include chip-to-chip communications or provide a mechanism to determine position of a chip in a battery pack. Chips within a battery system are configured (e.g., using an existing terminal) to determine a position within the battery stack and intra-chip communication is facilitated to improve cell balancing functions.

As an example, a plurality of battery protectors (e.g., battery protector chips) are provided to monitor and control charge and discharge operations of battery cells in a battery pack. Each battery protector is connected with a given subset of cells within the battery system (e.g., a battery pack) and is configured to control cell balancing operations for the cell subset and monitoring faults therein. A serial communications link is provided between battery protectors which allows for upward communications of information, such as for control of cell balancing and/or fault conditions of system stack members while mitigating the need for each battery protector of the stack to monitor and report on an individual basis (e.g., to an external host processor). This reduces circuit components in the overall system of battery since a single battery protector of the stack can monitor for current charging conditions of the entire stack while utilizing its respective serial output to communicate detected fault conditions to other stack members which in turn pass the serial signal up the stack of protectors.

Each battery protector can include a position input (e.g., a terminal) to detect an input voltage to determine its position (e.g., physical or logical position) within the stack. For instance, if the position input of a given battery protector is coupled to a predetermined power rail (e.g., ground), the given battery protector can determine it is positioned at a bottom position of the stack of multiple battery protectors. In response to determining that a given device is a bottom device for the stack, such bottom device can monitor for current charge and discharge state conditions of the battery pack. Additionally, other devices located at other (e.g., higher) positions in the stack are thus relieved of having to determine their position via expensive level shifters since their inputs are not referenced to ground as is the bottommost device of the stack.

In some examples, each battery protector includes a cell balancing input (CBI) to control cell balancing of the respective battery protector. The cell balancing output (CBO) of one battery protector is coupled to the CBI of another battery protector to control cell balancing of the other battery protector in the stack. For example, the CBO of one protector can be daisy-chained to the CBI of another protector to form an inter-chip serial communications link for the stack. The respective battery protector positioned as the bottom device of the stack may be configured to sense current from the plurality of battery cells (e.g., via a current sense resistor) and to control its CBO in response to the sensed current and its CBI. The bottom device CBI can be controlled (e.g., in response to a user input) to enable or disable operations for the entire stack.

As used herein, the term "circuit" can include a collection of active and/or passive elements that perform a circuit function, such as an analog circuit or digital circuit. Additionally or alternatively, for example, the term "circuit" can include an IC where all or some of the circuit elements are fabricated on a common substrate (e.g., semiconductor substrate, such as a die or chip), such as disclosed herein.

FIG. 1 illustrates an example of a battery system (e.g., a battery pack for a portable device) 100 that employs chip position sensing. The battery system 100 includes a plurality of battery cells 110 shown as cell subsets 1 at 112 through cell subset N at 116, where N is a positive integer denoting the number of cell subsets. The cell subsets 112-116 are connected between a first power rail (e.g., VDD) and a second power rail (e.g., VSS). Each subset of battery cells may include the same or a different number of cells.

The battery system 100 also includes a plurality of battery protectors shown as battery protector 120 through battery protector (N) at 124 that are configured as a stack. Each battery protector 120-124 of the stack is configured to protect cell subsets 112-116. Each battery protector 120-124 includes one or more inputs coupled to a respective cell subset 112-116. A position detector (PD) for each battery protector 120-124 is configured to detect whether a respective battery protector is coupled to the second power rail and thus positioned at a bottom of the stack (e.g., coupled to the second power rail). In this example, only battery protector 120 (e.g., first battery protector) is coupled to the second power rail through a discharge resistor R1 and thus, would be identified at the bottom of the stack. Battery Protector 2 at 122 (e.g., second battery protector) and Battery Protector N at 124 in this example have their respective PD inputs left unconnected and thus would not identify themselves as being at the bottom position of the stack. As used herein, the term bottom device or bottom position or bottom of the stack refers to the battery protector that is coupled at an end of the stack, such as directly coupled through resistor R1 (also referred to as discharge resistor having discharge resistor value) to the second power rail. Other higher position members of the stack of battery protectors are successively coupled away from the bottom device by the serial communications links described herein and operate at higher relative potentials that are closer in magnitude to the first power rail.

A cell balancing input (CBI) on each battery protector 120-124 controls cell balancing of the respective battery protector. A CBI of battery protector 120, shown at 130, can be controlled as a user input for sensed bottom devices, such as to selectively enable and disable overall cell balancing of the stack. As used herein, the term cell balancing refers to a state where a switch device in the battery protector is activated (e.g., switch enabled) in cell-balancing mode to divert charge current away from a respective cell subset that is to be balanced. For example, when the cell balancing is disabled, the switch devices are inactive (e.g., switch disabled), each of the cells receives its full charging current from a power source, such as supplied between the first and second power rails. Although switch bypass techniques are described herein for cell-balancing, other methods for cell balancing can be provided such as via capacitor-based shuttle balancing where charge is transferred from one cell to another. A cell balancing output (CBO) for each battery protector 120-124 is coupled to a CBI of a higher battery protector in the stack to control cell balancing of another battery protector in the stack. The respective battery protector positioned at the bottom of the stack (battery protector 120 in this example) is configured to sense current (e.g., through another resistor) from the plurality of battery cells and to control its CBO in response to the sensed current and its CBI.

A comparator (see, e.g., FIG. 6) can be provided to monitor the position detector (PD) with respect to a threshold voltage, where the position input to the position detector is pulled down to the second power rail by the resistor R1 to indicate that the respective battery protector is the bottom device of the stack. The resistor R1 can have a value (e.g., impedance value) that is configured to set an over current limit threshold for the respective battery protector that is the bottom device of the stack. If the over current limit threshold is exceeded, a fault can be detected, in response to which the CBO of the respective battery protector is set to disable cell balancing of the adjacent battery protector in the stack (e.g., battery protector 2). In another example, the resistance value of resistor R1 can be configured to two or more different over current thresholds, where a first current threshold is triggered with a first delay and at least a second current threshold is triggered with a different delay than the first delay. For example, if a load is placed on the battery cells 110 that exceeds a first threshold value (e.g., very large load) the first delay period (e.g., short delay period) can kick in which disables the load. If a smaller load yet still potentially harmful to the battery cells 110 is sensed via a second threshold, the second delay can cause shutdown of the load. In an example implementation for the battery system 100, each battery protector 120-124 can be implemented as an integrated circuit (IC) chip.

Previous battery systems had technical problems since cell balancing was always set on irrespective of the charge condition state of the battery cells and this could lead to over-stressing of cells. The battery system 100 described herein solves this problem by sensing the charge condition state of the battery cells and enabling cell balancing within a subset of cells that may need to be balanced without affecting other battery cell members and thus conserving cell balancing cycles to unaffected cells. Moreover, existing battery systems had technical problems by only observing individual device's battery cells and balancing. This problem required additional circuitry so that each battery protection member could do its own sensing and balancing. In contrast, the battery systems described herein solves this problem by utilizing bottom-device sensing which places the burden of charge state sensing on the bottom device while alleviating this burden from other battery protection device members. This in turn lowers external and internal component costs for other battery protection members since they do not need the full complement of charge state sensing circuitry. Furthermore, previous battery protection systems had the problem of not providing chip-to-chip communications for fault and charge-state sensing which is solved by the CBO and CBI communications described herein. The chip-to-chip communications also solves the problem of scalability for a given battery protector system since additional battery cells and respective battery protectors can be added by merely coupling into the CBO of the last battery protector in the stack to the CBI of a newly added battery protector to the stack.

Figure 2:
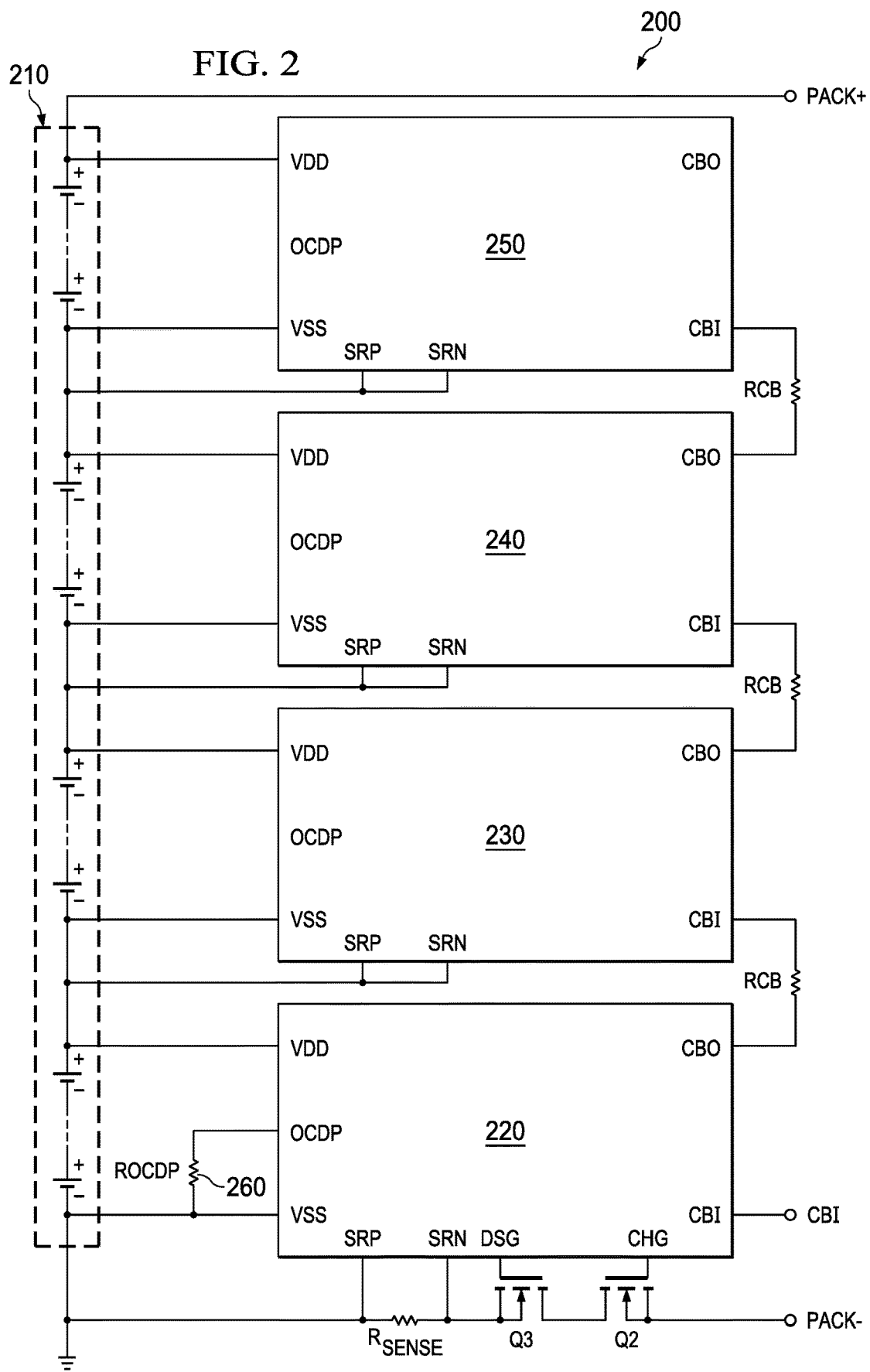
FIG. 2 illustrates an example block diagram of a plurality of battery protectors arranged in stack for a battery system that employs chip position sensing.

FIG. 2 illustrates an example of a multi-battery protector stack 200 for a battery system (e.g., battery pack device) that employs chip position sensing. The battery pack includes PACK+ and PACK− connector terminals to which an external system, such as a load and/or charger may be connected or removed, selectively. While in this example four battery protectors 220, 230, 240 and 250 are illustrated, in other examples, more or less than four battery protectors can be provided in the multi-battery protector stack 200. Each of the battery protectors 220, 230, 240 and 250 can be implemented as a separate integrated circuit chip. The multi-battery protector stack 200 includes a plurality of battery cells 210 that are coupled to the battery protectors 220, 230, 240, and 250. In this example, one of the battery protectors 220 in this example is the bottom device of the stack and each of the battery protectors 230, 240 and 250 is at a successively higher position in the stack. The bottom device of the battery protectors 220 is self-identified as the bottom position by resistor 260 that is coupled between a voltage rail (e.g., electrical ground) and an over discharge protection (OCDP) input terminal (e.g., corresponding to PD input of FIG. 1).

The OCDP input has a dual function of both identifying the bottom protector of the stack and setting one or more over discharge current thresholds (e.g., different delay time interval depending on which over current threshold reached) and associated delay times based on the impedance value of resistor 260. The discharge resistor value at the OCDP terminal can be configured to set at least two different over current thresholds, in which a first of the over current thresholds is triggered after a first delay time interval and a second of the over current thresholds is triggered with a different delay time interval than the first delay. The following Table 1A illustrates some example impedance values for resistor 260 of over current discharge protection delay times based on load current for the battery cells 210. The term upper device in the Table 1A refers to all non-bottom devices in the stack whose input impedance is very high (e.g., 10 Meg ohm) indicating a non-bottom device.

TABLE 1A

|  | Resistor Value | OCD1 Delay | OCD2 Delay |
|---|---|---|---|
| #1 | 750 kΩ ± 1% | 1420 ms | 700 ms |
| #2 | 604 kΩ ± 1% | 700 ms | 350 ms |
| #3 | 487 kΩ ± 1% | 350 ms | 180 ms |
| #4 | 383 kΩ ± 1% | 180 ms | 90 ms |
| #5 | 294 kΩ ± 1% | 90 ms | 45 ms |
| #6 | 196 kΩ ± 1% | 45 ms | 20 ms |
| #7 | 100 kΩ ± 1% | EEPROM Delay Options (EC Table) | |
| #8 | 10 MΩ ± 5% | Upper Device | |

A resistor RSENSE on the bottom device of the battery protectors 220 is shown connected between sense resistor plus (SRP) and sense resistor negative (SRN) inputs of the identified bottom device of the battery protectors 220. Depending on the direction of current flow through RSENSE, the bottom device of the battery protectors 220 can determine whether the battery cells 210 is charging (e.g., from an applied power source) or discharging due being connected to a load. Transistors Q2 and Q3 are controlled by outputs discharge (DSG) and charge (CHG) to control charging and discharging of the battery cells 210. These can be turned off and on based on sensing of over current discharging, over voltage conditions, and/or sensed temperature conditions. Higher members of the battery stack can communicate their fault status downward which are received by inputs (not shown) that are illustrated and described with respect to FIG. 9.

As shown, the CBO of each lower position battery protectors of the stack is coupled though a resistor RCB to the CBI of an adjacent higher position device of the stack to control cell balancing and fault operations of the stack. For example, a high output on CBO can be interpreted as an enable signal for cell-balancing if received at a CBI input of a respective device, whereas a low output on CBO can be interpreted as a disable signal for cell-balancing. In other implementations, low CBO signals can communicate an enable for cell-balancing whereas high CBO signals can communicate a disable. Also, the OCDP inputs are left floating for each battery protectors 230, 240, and 250. Thus, each battery protectors 230, 240, and 250 will not identify itself as the bottom position of the stack. Additionally, respective sense inputs SRP and SRN of battery protectors 230, 240, and 250 are disabled by electrically connecting them to the VSS common input terminal of each respective battery protector device.

In this example, each of the battery protectors 220-250 can include sense inputs SRP and SRN configured to sense the current from the plurality of battery cells in the stack if the respective battery protector is positioned as the bottom device of the stack. Since only the bottom member is responsible for sensing, additional sensing components such as sense resistors are not utilized by the upper stack members thus conserving power and circuit costs. Each battery protector 220-250 can also include output controls such as DSG and CHG, where the respective battery protector positioned as the bottom device of the stack is configured to control charge and discharge switch devices from the output controls in response to the sensed current. If an over current discharge is sensed by the sense inputs SRP and SRN, the respective battery protector positioned as the bottom device of the stack can be configured to turn-off the discharge switch device to disable discharging of the plurality of battery cells and to turn-on the charge switch device to enable charging of the plurality of battery cells.

Figure 3:
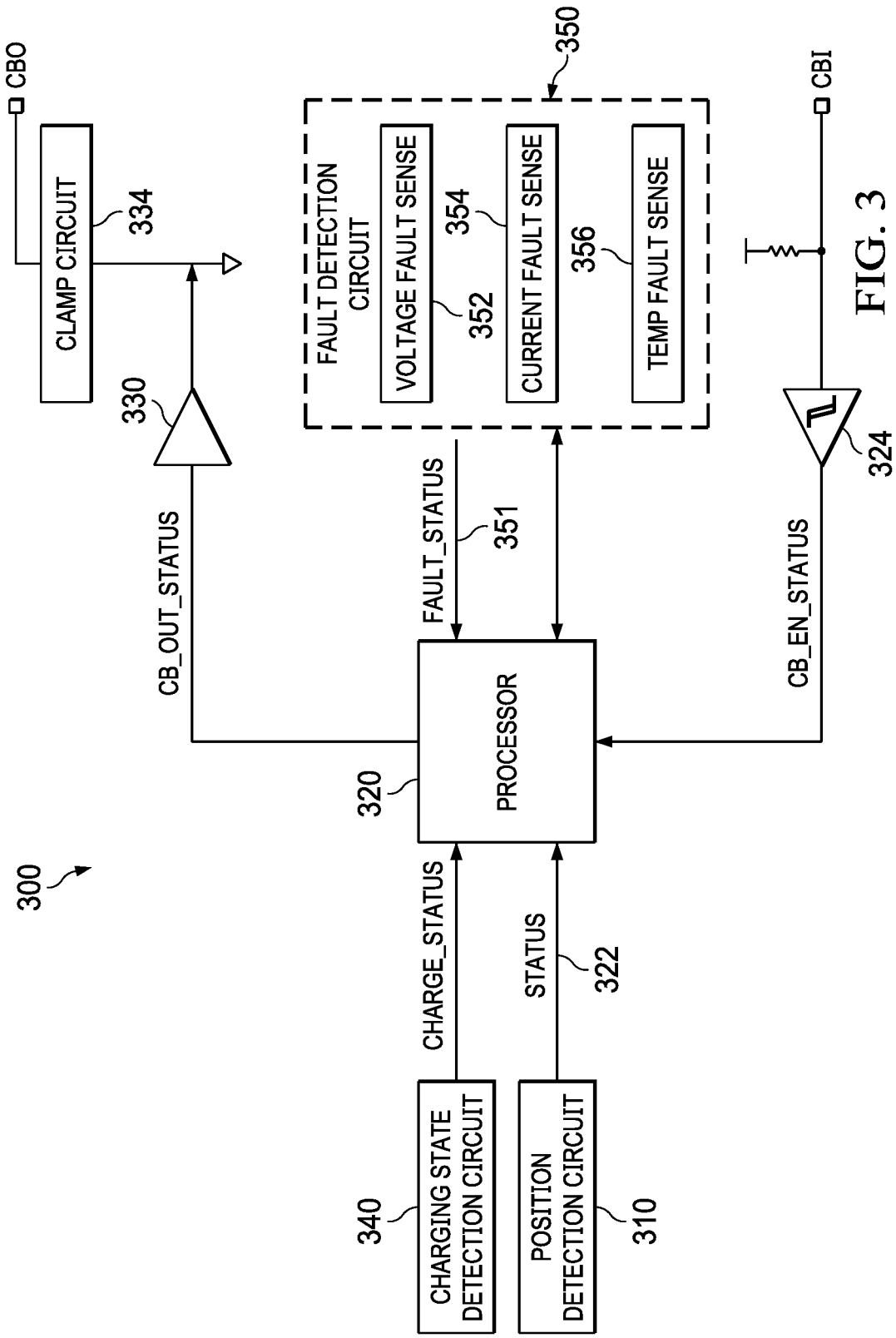
FIG. 3 illustrates an example block diagram of a battery protector device that employs chip position sensing.

FIG. 3 illustrates an example of part of a battery protector device 300 that employs chip position sensing. The battery protector device 300 is configured to protect a subset of a plurality of battery cells (not shown) that are connected between a first voltage rail and a second voltage rail of the battery protector device. The battery protector device 300 includes a position detection circuit 310 configured to detect whether the battery protector is coupled to the second power rail and thus positioned as a bottom device of a stack of battery protectors, such as disclosed herein. A processor 320 receives a status signal 322 from the position detection circuit 310 to determine if the battery protector device is configured as the bottom device of the stack. For example, the processor 320 may set an operating state to indicate that the battery protector device is the bottom device in the stack. A cell balancing input (CBI) terminal receives a CBI signal that controls cell balancing of the battery protector in response to a signal that is applied at the CBI terminal. The CBI is coupled through comparator 324 to provide a CB_EN_status signal to the processor 320 based on the signal received at the CBI terminal. The processor 320 enables or disables cell balancing based on the CB_EN_status signal.

The processor 320 drives a cell balancing output (CBO) through buffer 330 and clamp circuit 334 to control cell balancing of another battery protector as described herein. For example, the processor 320 provides a cell balancing output status signal (CB_OUT_status) to the buffer, which controls operation of a switch (see e.g., S1 FIG. 4), which is coupled between an internal ground and the clamp circuit 334.

The battery protector device 300 also includes a charging state detection circuit 340 that provides an indication of the charging status (Charge status) to the processor 320. For example, the charging state detection circuit 340 includes sense inputs (see e.g., SRN and SRP of FIG. 2) that are configured to sense current from the plurality of battery cells if the battery protector is operating as the bottom protection device of the stack (e.g., based on the status signal 322). The processor 320 thus is configured to determine the charging state of the battery pack based on the Charge_status signal.

The battery protector device 300 also includes a fault detection circuit 350 that is configured to detect one or more fault conditions and send fault status 351 that indicates one or more of the fault conditions described herein and based on receiving one or more battery cell inputs. For example, the fault detection circuit 350 includes a voltage fault sense circuit 352 configured to sense voltage faults (e.g., over voltage of a cell subset). A current fault sense circuit 354 is configured to sense current faults (e.g., over current discharge), such as may be set based on the resistor coupled to an OCDP input terminal. The fault detection circuit 350 may also include a temperature fault sense circuit 356 configured to detect temperature faults (e.g., over temperature faults of the battery protector or the battery cells).

The fault detection circuit 350 is coupled to communicate status information by fault status 351 (one or more fault status signals) to the processor 320 in response to detecting fault conditions. In response to detecting a fault condition, the processor can disable the CBO to deactivate cell balancing in next higher positioned battery protection device in the stack. In the absence of fault condition, the processor can enable the CBO to enable cell balancing in next higher positioned battery protection device in the stack. In another example, in response to a fault condition being sensed by the fault detection circuit 350, a fault output terminal of the battery protector can be configured to communicate an occurrence of the fault condition to another battery protector in the stack (see e.g., FIG. 9 communicating faults downward from DSG and CHG outputs).

Figure 4:
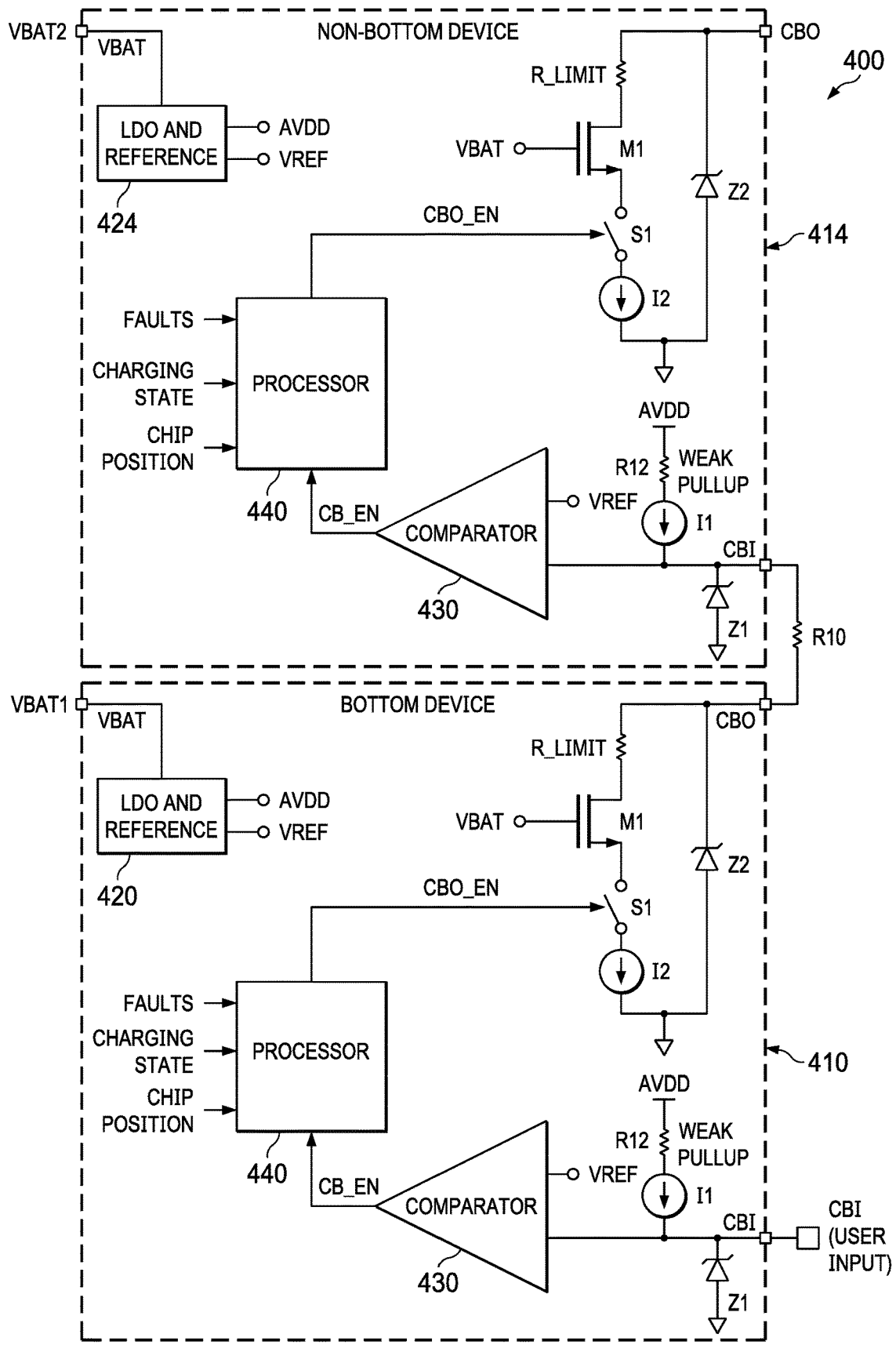
FIG. 4 illustrates an example circuit diagram of multiple battery protector devices connected serially to form a battery stack.

FIG. 4 illustrates an example circuit 400 of multiple battery protector devices (e.g., 2 battery protectors) connected serially to form a battery stack. In this example, a bottom device 410 has its CBO coupled to the CBI of a device 414 through resistor R10. Each device can include a linear regulator 420 and 424 respectively to provide internal reference voltages (VREF) for comparison thresholds and internal working voltages (AVDD) for different circuit functions of the respective battery protector device. For purposes of brevity, only the circuit functions of the bottom device 410 are described since they are replicated in the device 414. As shown, the CBI input of the bottom device 410 (e.g., driven from a user controlled-source) is coupled to a Zener protection diode Z1 (e.g., to protect against input current spikes) and fed by a current source I1 and resistor R12 and driven from internal power source AVDD.

Figure 5:
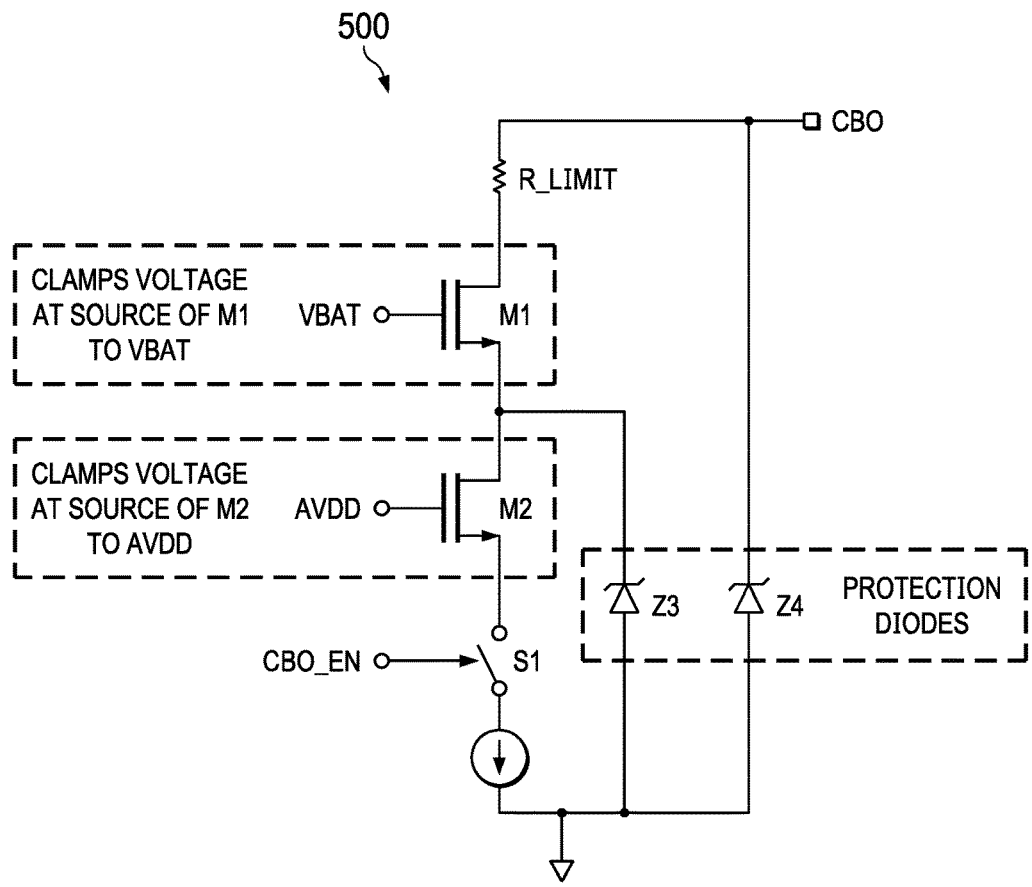
FIG. 5 illustrates an example circuit diagram of an alternative output circuit for the circuits depicted in FIG. 4.

A comparator 430 monitors the CBI with respect to VREF and provides a CB_EN output to a processor 440. The processor 440 issues CBO_EN which drives switch Si which allows current to flow through current source 12 and transistor switch device M1 if no faults are detected and CBI is enabled. As shown, M1 is also enabled by its gate terminal receiving sensed battery voltage for a respective cell subset. A current limiting resistor R_limit can be provided to limit the current from M1 where protection diode Z2 can be provided for CBO output protection. Similar to the circuit described above with respect to FIG. 3, the processor 440 can monitor charging state status inputs and fault inputs to control switch S1 and FIG. 5 illustrates an example circuit of an alternative output circuit for the CBO driving circuit depicted in FIG. 4. In this example, two transistors can be placed in series with switch S1. Transistor M1 is turned on by VBAT from a respective battery cell (or cells) and transistor M2 is activated based on the internal supply voltage AVDD from the linear regulator being available. Thus, M1 clamps the voltage at its source terminal to the value of VBAT whereas M2 clamps the voltage at its source terminal to AVDD. Protection devices Z3 and Z4 can be provided in this configuration. As shown, switch S1 enables or disables M1 and M2 in response to processor output CBO_EN.

Figure 6:
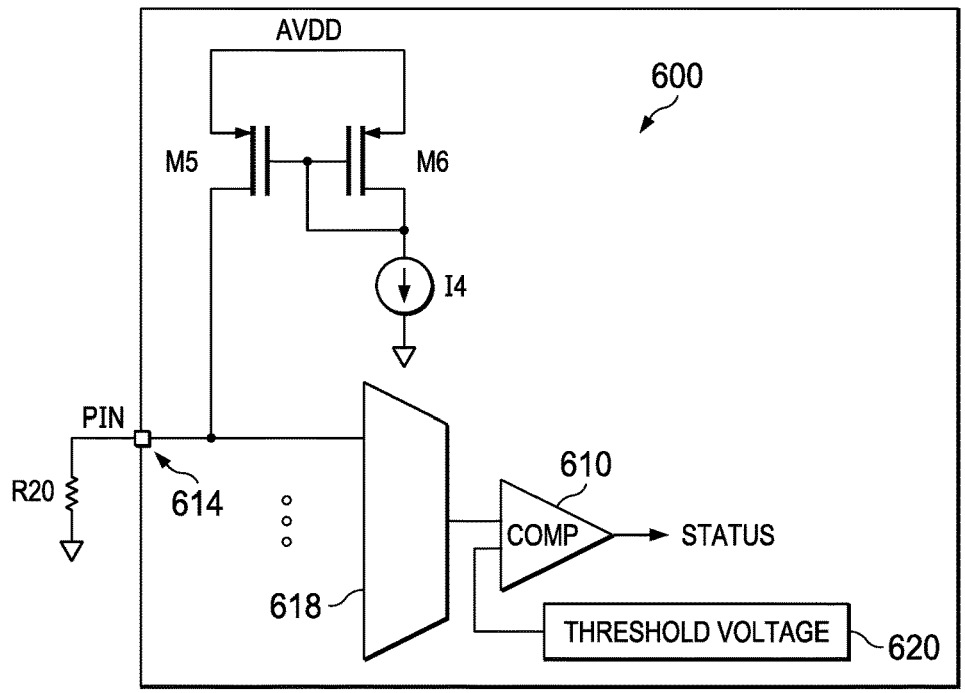
FIG. 6 illustrates an example circuit diagram for chip position sensing.

FIG. 6 illustrates an example circuit 600 for chip position sensing. A comparator 610 can be provided to monitor the position input 614 through multiplexer 618 with respect to a threshold voltage 620. As shown, the position input 614 is pulled down to the second rail by a discharge resistor R20 to indicate that the respective battery protector is the bottom device of the stack. If R20 is not connected, a pull-up circuit consisting of mirror transistors M5 and M6 which drive a current source 14 and bias the comparator 610 to indicate that this battery protector is not a bottom device. As described previously, the discharge resistor R20 can be configured with an impedance value to set an over current limit threshold for the respective battery protector that is the bottom device of the stack. If the over current limit threshold is exceeded, the CBO of the respective battery protector is set to disable cell balancing of another battery protector in the stack.

In one example, the threshold voltage can be set at different voltage levels (e.g., by a processor) to determine the value of the resistor R20, where higher threshold voltages will be exceeded at the comparator 610 based on higher impedance values of R20. Thus, R20 serves multiple functions of both setting the bottom chip detection and setting the time of delay for when the over current discharge is set based on sensed current from the SRN and SRP terminals previously described. The multi-function capability of the position input 614 conserves the amount of components needed in the circuit and thus mitigates overall costs of the circuit and system.

Figure 7:
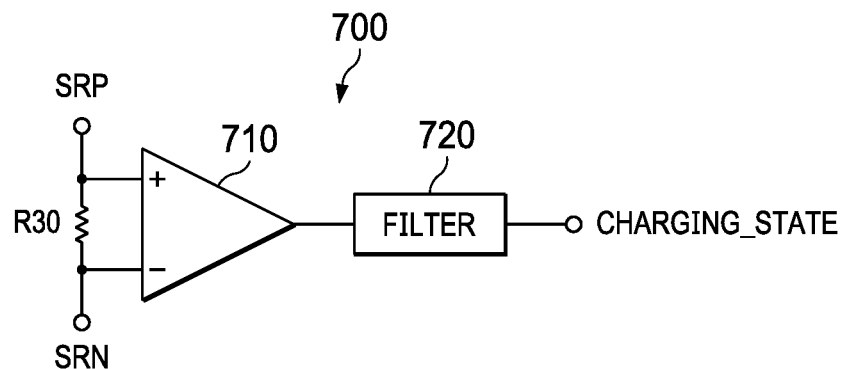
FIG. 7 illustrates an example sense circuit diagram for sensing charging and discharging of a battery pack.

FIG. 7 illustrates an example sense circuit 700 for sensing charging and discharging of a battery pack. The sense circuit 700 includes a sense resistor R30 connected to at least one sense input. In this example R30 is connected between pins sense resistor positive (SRP) and sense resistor negative (SRN) as previously described. A sense amplifier 710 receives a voltage generated by R30 in response to battery pack charging or discharging current through R30 and drives a filter 720 to provide a charging state output signal.

Figure 8:
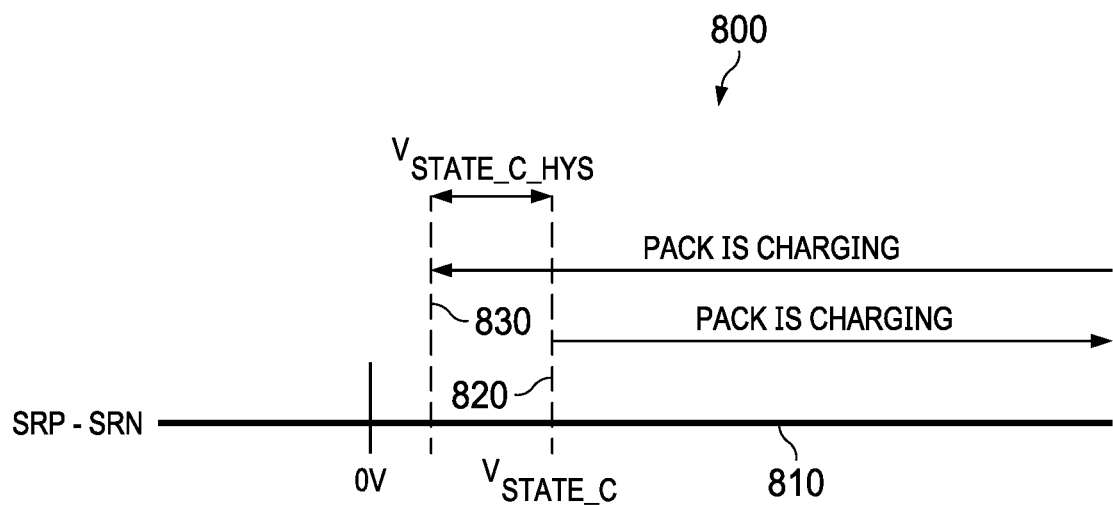
FIG. 8 illustrates an example charging and discharging diagram for the circuit of FIG. 7.

FIG. 8 illustrates an example charging and discharging diagram for the sense circuit 700 of FIG. 7. A line 810 represents voltage levels sensed on the SRP/SRN pins described above with respect to FIG. 7. At line 820, a voltage above zero volts across SRP/SRN represents when the battery pack is charging. A desired amount of hysteresis can be provided (e.g., in the sense amplifier 710 of FIG. 7) where the charging state of the battery pack is detected at a level below the line 820 at line 830. The hysteresis mitigates false detection tripping for the voltage conditions for when the charging state for the pack is detected. Thus, the charging state is signaled as no longer charging when the SRP/SRN voltage falls below the line 830.

Figure 9:
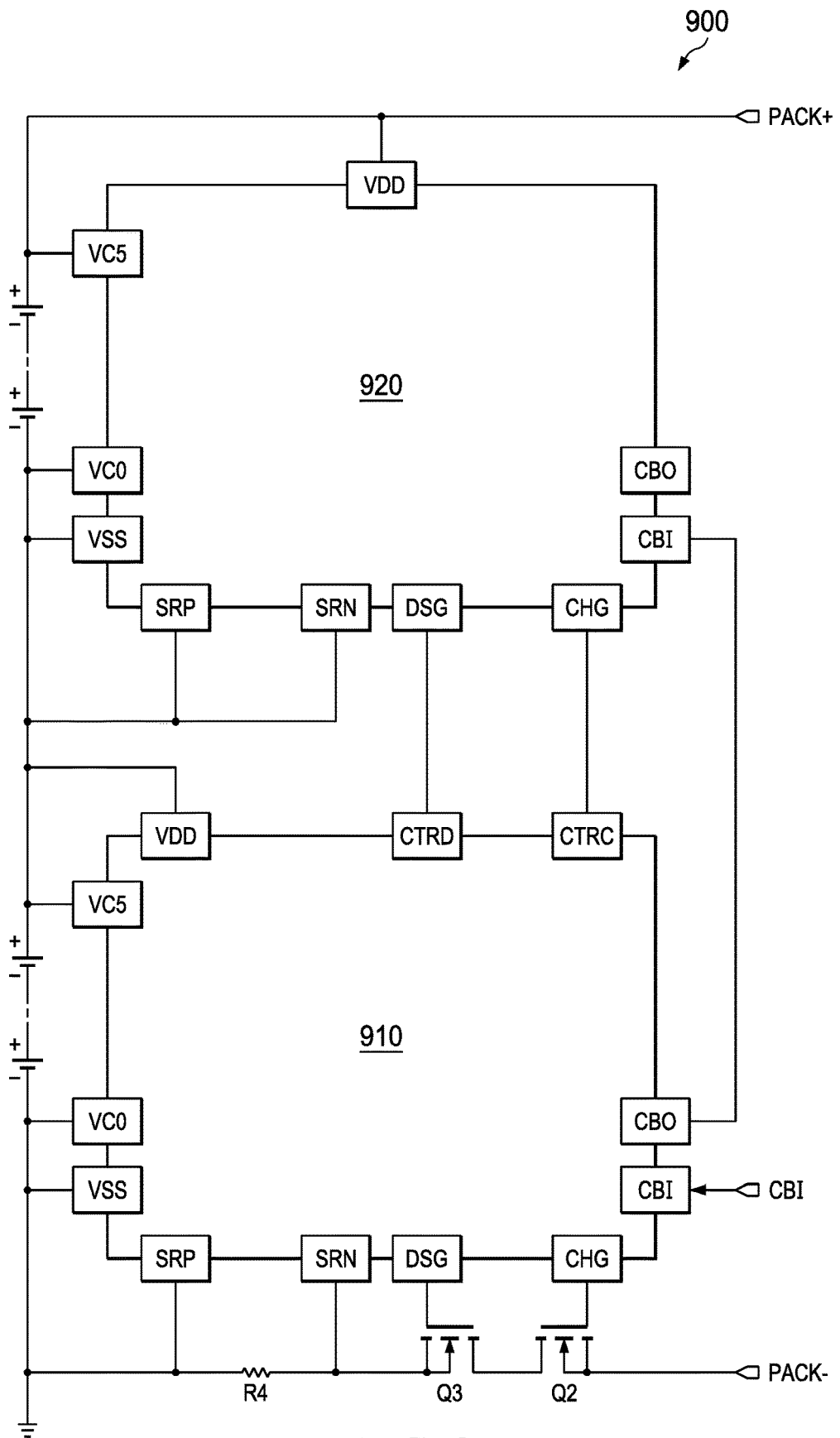
FIG. 9 illustrates and example block diagram for communicating faults from higher members of a battery stack to lower members.

FIG. 9 illustrates and example circuit 900 for communicating faults from higher members of a battery stack to lower members. Battery protector 910 is identified as the bottom chip in this example and monitors sense resistor R4 from inputs SRP and SRN for battery pack (PACK+ and PACK−) over current charge or discharge conditions. Transistors Q2 and Q3 are controlled by the battery protector 910 to control selective discharging, charging, and/or disconnecting the battery pack from a give load. The CBO of battery protector 910 is fed to the CBI of battery protector 920 to control cell balancing operations of the battery protector 920. Each battery protector 910 and 920 have input pins VSS and VC0 connected to the lowest potential of a given cell subset whereas each of the protectors have respective VDD and VC5 pins connected to the highest potential of a given cell subset.

As shown, the SRP and SRN pins of battery protector 920 are connected to VSS of the subset since this protector is not the bottom device of the stack and thus, overcurrent charge and discharge monitoring is disabled. If battery protector 920 senses a fault, such as via the voltage fault, current fault, and temperature fault circuits previously described herein, it can set its respective fault output from fault signal (or signals) DSG and CHG in a binary pattern to indicate which of the faults was detected. Based on a detected fault, the battery protector 910 can receive the fault status from 920 through fault input terminal (or terminals) CTRD and CTRC. Any lower device receiving a fault from inputs CTRD and CTRC can also disable its respective CBO line in response thereto.

Figure 10:
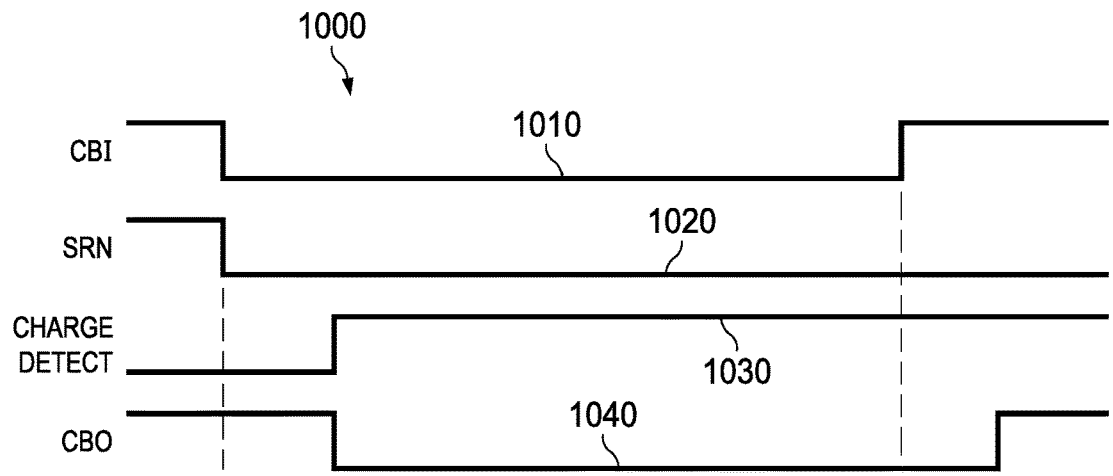
FIG. 10 illustrates an example signal diagram for a battery protector that employs CBI and CBO communications signals.

FIG. 10 illustrates an example signal diagram 1000 for a battery protector that employs CBI and CBO communications signals. At 1010, a CBI input signal is asserted at 1010 to enable cell balancing for a given battery protector. In response to the CBI asserting at 1010, the SRN/SRP input begins sensing at 1020. After a period of time for sensing, a charge detect signal is asserted at 1030. Based on charging condition being detected at 1030, the CBO output is asserted at 1040 to enable cell balancing of another battery protector in the stack.

Figure 11:
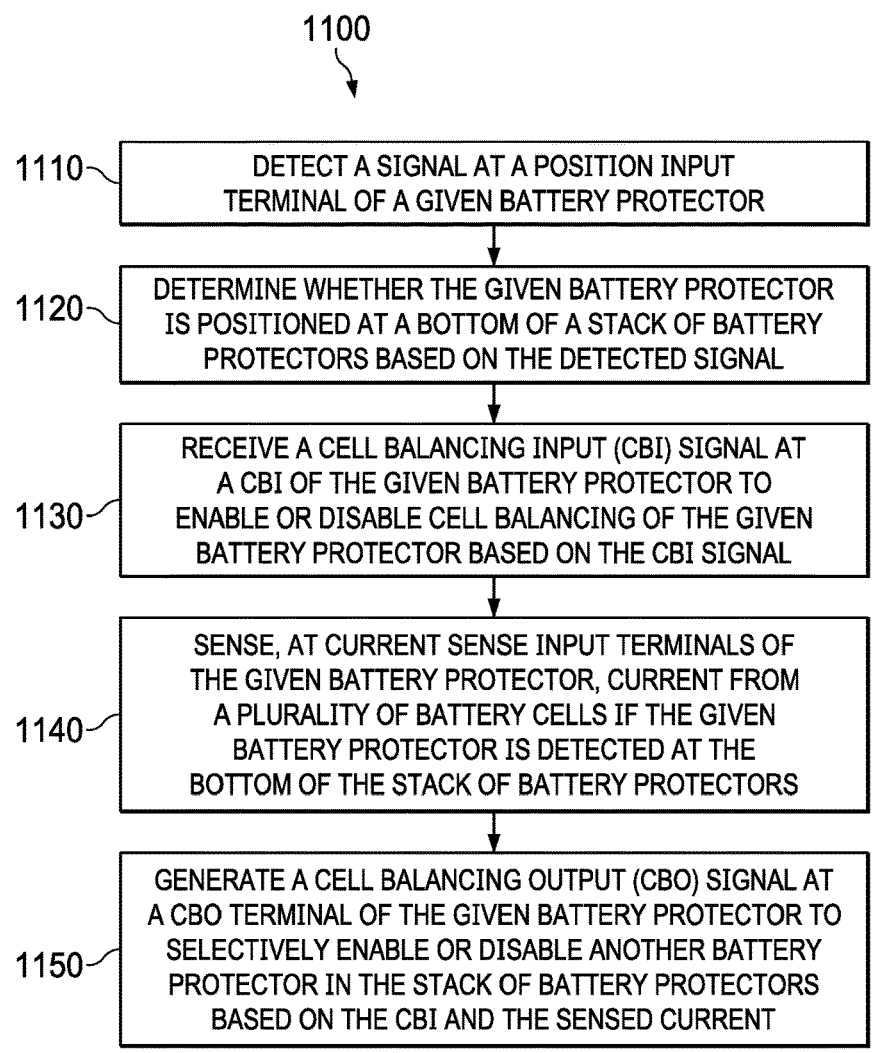
FIG. 11 illustrates an example method for a battery protection that employs chip position sensing.

In view of the foregoing structural and functional features described above, example methods will be better appreciated with reference to FIG. 11. While, for purposes of simplicity of explanation, the method is shown and described as executing serially, it is to be understood and appreciated that the method is not limited by the illustrated order, as parts of the method could occur in different orders and/or concurrently from that shown and described herein. Such method can be executed by various hardware circuits, such as including those disclosed herein, for example.

FIG. 11 illustrates an example method 1100 for a battery protection that employs chip position sensing. At 1110, the method 1100 includes detecting a signal at a position input terminal of a given battery protector. At 1120, the method 1100 includes determining whether the given battery protector is positioned at a bottom of a stack of battery protectors based on the detected signal. At 1130, the method 1100 includes receiving a cell balancing input (CBI) signal at a CBI of the given battery protector to enable or disable cell balancing of the given battery protector based on the CBI signal. At 1140, the method 1100 includes sensing, at current sense input terminals of the given battery protector, current from the plurality of battery cells if the given battery protector is detected at the bottom of the stack of battery protectors. At 1150, the method 1100 includes generating a cell balancing output (CBO) signal at a CBO terminal of the given battery protector to selectively enable or disable another battery protector in the stack of battery protectors based on the CBI and the sensed current. Although not shown, the method 1100 can also include generating a fault condition at a fault output of each of a plurality of battery protectors in the stack of battery protectors to communicate the fault condition to a respective lower battery protector device in the stack of battery protectors based on a fault being detected. The method 1100 can also include generating a cell balancing output (CBO) signal at a CBO terminal of the given battery protector to selectively enable or disable cell balancing of another battery protector in the stack of battery protectors based on a fault being detected.

Previous battery protection methods had technical problems since cell balancing was always set on irrespective of the charge condition state of the battery cells and this could lead to over-stressing of cells. The battery protection method described herein solves this problem by sensing the charge condition state of the battery cells and enabling cell balancing within a subset of cells that may need to be balanced without affecting other battery cell members and thus conserving cell balancing cycles to unaffected cells. Moreover, existing battery methods had technical problems by only observing individual device's battery cells and balancing. This problem required additional circuitry so that each battery protection member could do its own sensing and balancing. In contrast, the battery methods described herein solves this problem by utilizing bottom-device sensing which places the burden of charge state sensing on the bottom device while alleviating this burden from other battery protection device members. This in turn lowers external and internal component costs for other battery protection members since they do not need the full complement of charge state sensing. Also, previous battery protection methods had the problem of not providing chip-to-chip communications for fault and charge-state sensing which is solved by the CBO and CBI serial communications described herein.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. A battery system, comprising:
   first and second power terminals;
   battery cells connected between the first and second power terminals;
   a resistor; and
   a stack including first and second battery protectors, each of the first and second battery protectors coupled to a respective subset of the battery cells, the first battery protector positioned at a bottom of the stack, and the first battery protector comprising:
   a position input coupled through the resistor to the second power terminal;
   a position detector comprising a comparator, the comparator configured to monitor the position input with respect to a threshold voltage and to detect that the first battery protector is positioned at the bottom of the stack based on the monitoring;
   a cell balancing input (CBI) configured to receive a CBI signal to enable or disable cell balancing of the first battery protector; and
   a cell balancing output (CBO) configured to enable or disable cell balancing of the second battery protector, wherein the first battery protector is configured to sense an electrical condition of the battery system and to control the CBO, responsive to the CBI signal and the sensed electrical condition.

2. The system of claim 1, wherein: the resistor is configured with an impedance to set an over current limit threshold for the first battery protector; and the CBO of the first battery protector is configured to disable cell balancing of the second battery protector, responsive to the over current limit threshold being exceeded.

3. The system of claim 2, wherein the impedance of the resistor is configured to set at least two different over current thresholds, in which a first of the over current thresholds is triggered after a first delay time interval, and a second of the over current thresholds is triggered with a different delay time interval than the first delay time interval.

4. The system of claim 1, wherein each of the first and second battery protectors includes a respective sense circuit that is coupled to at least one sense input, and the sense circuit of the first battery protector is configured to sense current from the respective subset of the battery cells via the at least one sense input and to control the CBO thereof based on the sensed current.

5. The system of claim 4, further comprising charge and discharge switch devices configured to control outputs of the first battery protector, wherein the first battery protector is configured to control the charge and discharge switch devices responsive to the sensed current.

6. The system of claim 5, wherein the first battery protector is configured to: responsive to the sense circuit sensing an over current discharge, turn off the discharge switch device to disable discharging of the respective subset of the battery cells, and turn on the charge switch device to enable charging of the respective subset of the battery cells.

7. The system of claim 1, wherein each of the first and second battery protectors includes a respective fault detection circuit that includes at least one of: a voltage fault sense circuit configured to detect over voltage conditions of the respective subset of the battery cells; a current fault sense circuit configured to detect over current conditions of the respective subset of the battery cells; or a temperature fault sense circuit configured to detect temperature conditions of the respective subset of the battery cells.

8. The system of claim 7, wherein the second battery protector includes a fault output terminal that is coupled to a fault input terminal of the first battery protector and configured to communicate an occurrence of a fault condition detected by its respective fault detection circuit.

9. The system of claim 8, wherein the first battery protector is configured to communicate a fault to the second battery protector by outputting a disable signal at the CBO of the first battery protector.

10. The system of claim 1, wherein each of the first and second battery protectors is an integrated circuit (IC).

11. A battery protector device, comprising:
    battery cell terminals adapted to be coupled to a battery cell;
    a position input adapted to be coupled through a resistor to a power terminal;
    a threshold voltage terminal;
    a position detection circuit comprising a comparator, the comparator having an output and first and second inputs, the first input coupled to the position input, the second input coupled to the threshold voltage terminal, and the comparator configured to monitor the position input with respect to the threshold voltage terminal and to detect that the battery protector device is positioned at a bottom of a stack of battery protector devices based on the monitoring; and
    a processor having an input coupled to the output of the comparator, the processor coupled to a cell balancing output (CBO) terminal and coupled to a cell balancing input (CBI) terminal.

12. The battery protector device of claim 11, wherein: the resistor is configured with an impedance to set an over current limit threshold if the battery protector device is positioned at the bottom of the stack; and the battery protector device is configured to set the CBO to disable cell balancing of another battery protector device in the stack, responsive to the over current limit threshold being exceeded.

13. The battery protector device of claim 11, wherein the battery protector device is positioned at the bottom of the stack, the battery protector device further comprises charge and discharge switch devices configured to control outputs of the battery protector device, and the battery protector device is configured to control the charge and discharge switch devices responsive to the sensed current.

14. The battery protector device of claim 13, wherein the battery protector device is configured to: responsive to sensing an over current discharge, turn off the discharge switch device to disable discharging of the battery cell, and turn on the charge switch device to enable charging of the battery cell.

15. The battery protector device of claim 11, wherein the battery protector device includes a fault detection circuit that includes at least one of: a voltage fault sense circuit configured to detect over voltage conditions of the battery cell; a current fault sense circuit configured to detect over current conditions of the battery cell; or a temperature fault sense circuit configured to detect temperature conditions of the battery cell.

16. The battery protector device of claim 15, wherein the battery protector device is an integrated circuit comprising:
    a fault output terminal configured to communicate an occurrence of a fault condition detected by the fault detection circuit.

\* \* \* \* \*